June 2, 1970    R. C. BAENZIGER    3,516,033
TUNER WITH SEPARABLE HOUSING PARTS, ONE PART CARRYING ROTOR
AND ITS CONTACTS, OTHER PART CARRYING WIPER CONTACTS
Filed Jan. 10, 1966    2 Sheets-Sheet 1

Inventor:
Robert C. Baenziger
By John W. Gaines
Atty.

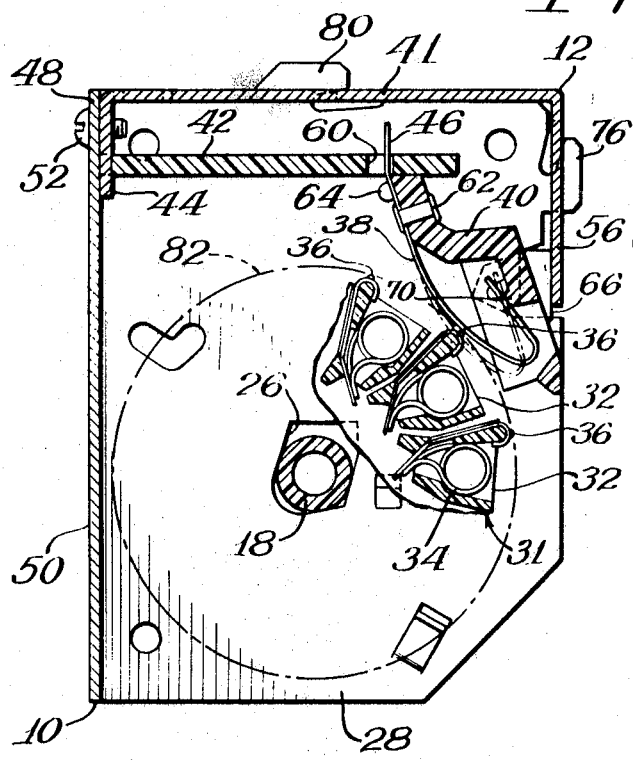
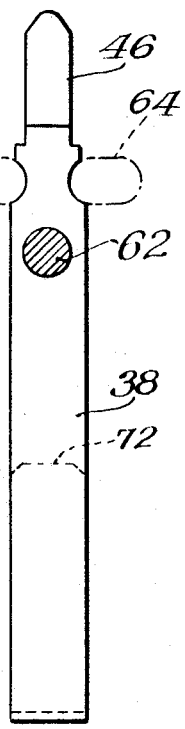
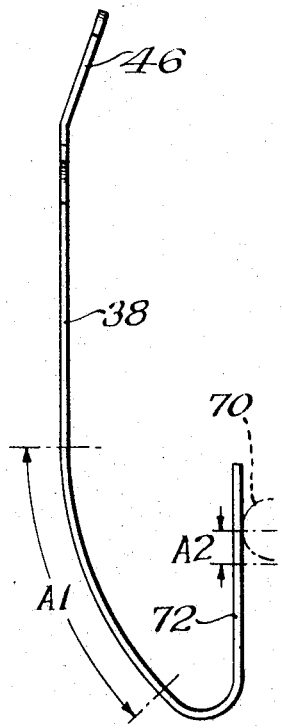
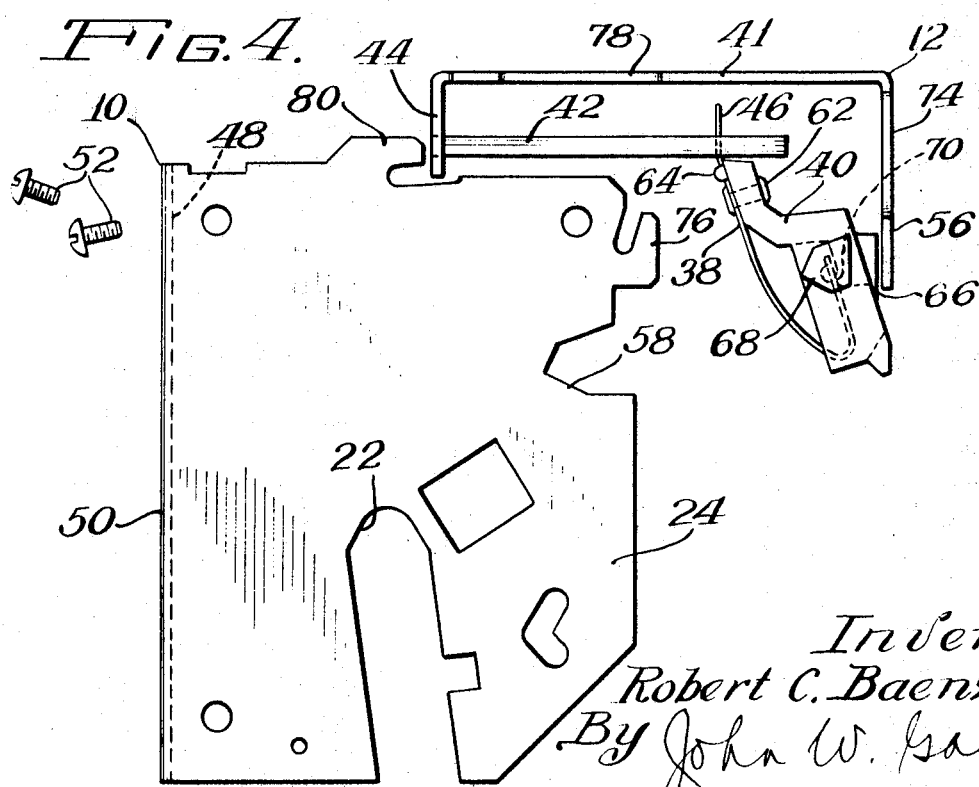
Inventor:
Robert C. Baenziger
By John W. Gaines
Atty.

United States Patent Office 3,516,033
Patented June 2, 1970

3,516,033
TUNER WITH SEPARABLE HOUSING PARTS; ONE PART CARRYING ROTOR AND ITS CONTACTS, OTHER PART CARRYING WIPER CONTACTS
Robert C. Baenziger, Cook County, Ill., assignor to Electro-Netic Steel, Inc., Schiller Park, Ill., a corporation of Illinois
Filed Jan. 10, 1966, Ser. No. 519,716
Int. Cl. H01h 9/02; H03j 5/00
U.S. Cl. 334—50                                      13 Claims

ABSTRACT OF THE DISCLOSURE

Electrical contact type, turret switched tuner having separable sheet metal housing parts and separative contact portions. More specifically, the housing comprises external major and minor parts which internally carry the contact portions and which, when separated, separate the separative contact portions.

---

Figure 1:
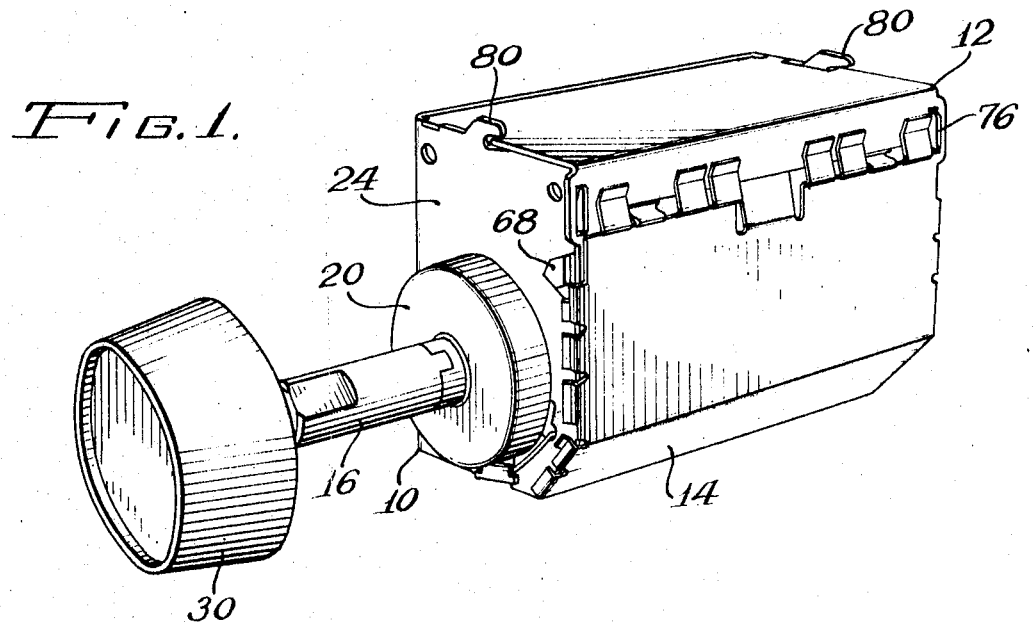

This application pertains to a turret tuner primarily adapted to receive radio or television frequencies. Such a tuner can, for example, directly cover the commercial very high frequency (VHF) television band and can be used in conjunction with another means to cover the ultrahigh frequency (UHF) television band.

The invention specifically relates to a readily manufactured and serviceable tuner construction having a separable housing. It more specifically relates to a turret-switched tuner in which a moving set of drum contacts on the turret engages a fixed set of spring-strip wiper contacts on a wiper or stator bar, and in which the tuner housing easily separates along convenient edges into respective minor and major parts, one carrying the fixed set and the other carrying the moving set of the contacts.

A service problem and a manufacturing problem have existed with turret tuners, particularly with but not limited to, wiper spring type turret tuners. The service problem resuls because the drum-like rotor element or turret which performs the switching function in the housing is required to be in a central position where perforce it blocks off an easy route of access to various other internal elements such as the electrical circuit components. In order to be repaired, or serviced by replacement of the elements, prior tuners have the rotor element so arranged, with the rotor shaft carried in bearing slots or holes in opposite ends of the case, that the shaft must be slid axially and then laterally withdrawn to enable the shaft and rotor element to be removed to some external point out of the way. Internal access thereafter continues as somewhat of a problem, because outside walls of the box-like case intervene and create a cramped and awkward path of exposure of various of the components and of some of the wiring deep in the tuner chassis.

The manufacturing problem is much the same in the latter respect. In other words, there is a relatively deep chassis or tuner case in which the electircal circuit components and wiring of the tuner are located and which does not provide ready access for installing and electrically interconnecting them.

Another problem which I have recognized in perfecting my invention is that, without a special design for supporting the wipers as I have herein employed, the contact pressure maintained against the drum contacts by the spring strip wipers lacks strength and endurance. The lack or loss of its force in sustained service makes the electrical contact insecure, and vulnerable to external mechanical shock and vibration which can thus disturb the circuit depending upon that contact.

Figure 2:
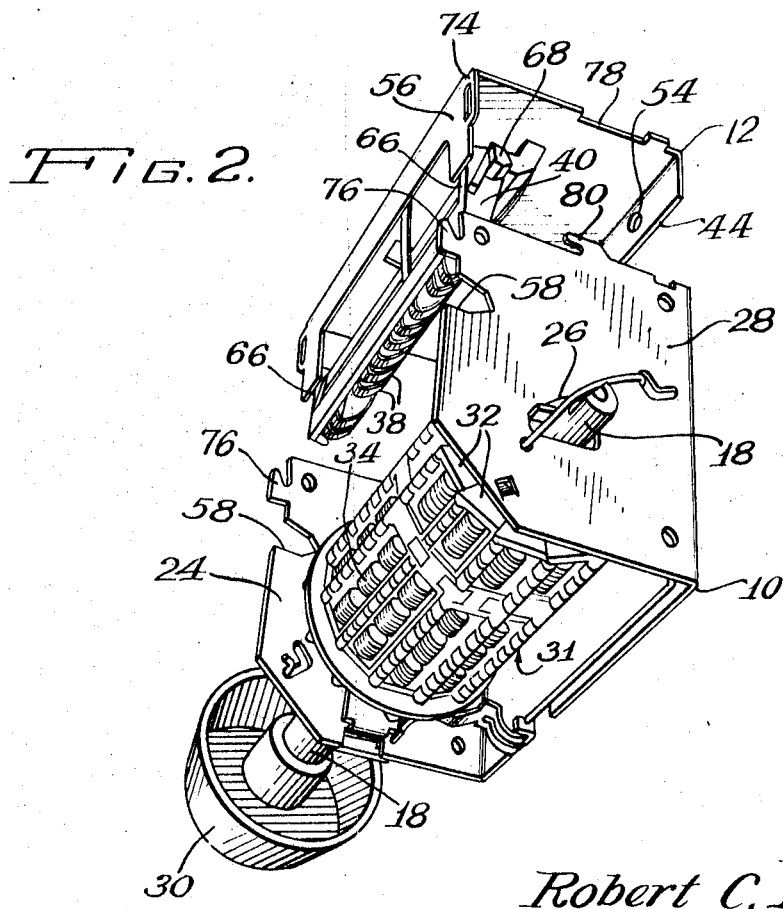

My invention has the technical advantage of materially reducing or substantially eliminating the foregoing problems as will now be explained. Various features, objects, and advantages of the invention will either be particularly pointed out or become apparent from the following description, taken in conjunction with the accompanying drawings which show a preferred embodiment thereof and in which:

FIGS. 1 and 2, respectively, are isometric front quarter and exploded rear quarter views of a tuner embodying the present invention;

FIGS. 3 and 4 are front, respective sectional and exploded views of the tuner housing, primarily; and FIGS. 5 and 6 are respective side and front views of a wiper spring typical of the fixed contacts used in the tuner.

More particularly in the tuner illustrated in the drawings, the housing has a C-shaped, sheet metal lower part 10 and a separable top 12 of smaller size which is also made of sheet metal in a C-shape. A generally springy metal shield 14 is snapped into place when the parts are together so as to close off the two open sides of the housing.

The lower part 10 carries the rotor mechanism of the tuner, including telescoped outer and inner shafts 16 and 18. The outer shaft 16 is the supported one, being operated by a knob, not shown, to set the pretuning mechanism of which the outside is shown at 20. The inner shaft 18 constiutes the supporting shaft and is journalled for rotation in a slot 22 in the front wall 24 of the lower part and in a slot 26 in the rear wall 28. The inner shaft 18 projects at the front end beyond the corresponding end of the supported shaft and carries a channel selector knob 30.

A rotor drum or turret 31 is fast to the shaft 18 and, when rotated thereby as the selector knob 30 turns, the turret on a step by step basis moves a selected tuning strip or trough 32 into an operative position. Each trough 32 carries a set of coaxial channel tuning coils 34 and a line of radially projecting contacts 36 which, when the trough occupies the selected position, connects the associated coils in an operative circuit of a receiver such as a television receiver, not shown. The resulting switching connections are effected by wiping contact of the contacts 36 with individual ones of a row of fixed, wiper spring contacts 38 carried by a wiper or stator bar 40. There are sometimes two, but generally only one of the stator bars 40 in a tuner, whereas the troughs 32 are usually of a number on the drum to form thereabout a complete annular row, e.g., thirteen troughs.

The top 12 forms the top wall 41 of the housing and carries, in parallel relation to the top wall, a circuit board 42 of insulating material. The circuit board 42 has tenon connections with a side attachment wall or flange 44 which is bent at right angles to and is integral with the top wall 41. The terminal ends 46 of the row of wipers 38 and other electrical components, not shown, on the circuit board 42 have soldered electrical connections with various insulated lead-ins, not shown, carried by the top wall 41 so as to mechanically rigidfy the position of the circuit board in the top 12.

The attachment flange 44 inwardly overlaps with a confronting attachment flange portion 48 along the top of a longitudinal side wall 50 of the lower part 10 of the housing. A pair of spaced apart metal screws 52 is used to detachably fasten the attachment flanges together, each screw passing through a smooth opening, not shown, in the flange portion 48 and into a registering threaded hole as indicated at 54 in FIG. 2. An opposite backing flange 56 is bent at right angles to and in integral with the top wall 41. Due to the flexible mounting of the stator bar 40 as will now be described, the bar 40 cooperates with the backing flange 56 and an outwardly opening pair of wedge-shaped V slots 58 formed one in each of the front and rear walls 24 and 28.

More specifically, the terminal ends 46 of the wipers pass through conventional, individual triangular slots 60 (FIG. 3) in the board 42 so that the solder eventually applied to the ends locks together the wipers and board. The wipers 46 are spring strips formed with rivet holes by which they are rivetted at 62 to the bar 40 and are further formed with boss cut-outs between the rivet holes and ends 46. Alignment bosses 64 on the bar 40, which is made of insulative material, alternate with the wipers to hold them from turning. Clearance (FIG. 4) between the bar 40 and the adjacent board, and clearance between the backing flange 56 and two stop pads 66 carried by the bar 40 enable the bar to adjust as the wipers flex about their fixed terminal ends 46.

A pair of wedge shaped, wing protrusions 68 (FIGS. 2 and 4) is disposed one at each end of the stator bar and each is complementarily received in the wall slot 58 at that end. A line of individual bar noses 70 between the wing protrusions 68 provides individual abutment connections on which the wipers ride.

The wipers 38 are J-shaped and the extended area of electrical contact is indicated on the curved long leg by the area A1 (FIG. 5). The curve loops over and into the short leg 72, on which the area of riding contact between it and the adjacent nose 70 is indicated by the area A2. During forming of each wiper spring 38 from an initial straight strip of which the two areas are in straight longitudinal alignment along the longitudinal axis of the strip, the looping back of the strip brings the areas A1 and A2 and their confronting points 36 and 70 into transverse alignment with one another at opposite sides of the loop. The outfacing sides of the loop on which the areas A1 and A2 are located are covered with a suitable lubricant so that the wipers can adjust while fully supported under load.

In assembly, the parts from the position as shown in FIG. 4 and brought together in a manner such that slotted lugs 74 on the backing flange 56 receive upstanding hook tabs 76 and overlie vertical edges of the adjacent front and rear walls 24 and 28. The top wall lug portions defining a pair of side cut-outs 78 overlie horizontal edges of the walls 24 and 28 so that the cut-outs receive lateral hook tabs 80. The bar wing protrusions 68 are cammed into the V slots 58, properly guiding and aligning the stator bar 40 and wipers 38 so that the latter have the right position and deflection relative to the arc 82 described by the movable contacts 36 as they are rotated. The two screws 52 are installed with a screwdriver and thereafter the hook tabs 76 are twisted and the hook tabs 80 are similarly twisted, each with pliers so as to toe inwardly toward the other tab. The overlapping relation causes each of the housing parts to be blocked at points holding it from the interior of the other part.

In operation, step by step rotation of the movable contacts 36 causes the loop of each wiper and the short leg thereof to coordinately rotate about the end of the long leg which is held in cantilever fashion by the board 42, the bosses 64, and the rivets 62. When the contacts 36 of a selected trough 32 are in the operative position, they are each substantially in a radial line from the center of the turret and of the shaft 18 to the opposed point of riding connection of the short leg 72 with the nose 70. The respective broken and solid lines in FIG. 3 illustrate undeflected and deflected positions of typical wiper, which is shown to be stably stressed in bending at all times of engagement with the confronting contact 36.

The accessibility for servicing and for original manufacture of the turret can be appreciated from FIG. 2. The accessibility for similar purposes of the circuit board 42 can be appreciated from FIG. 4, it being previously pointed out that the regular electrical components and interconnecting wiring are omitted from the simplified showing of the board. Suffice it to say that the circuits made up on the board perform their necessary functions with and utilize the various R.F. antenna and amplifier coils, the double tuned interstage to mixer coils, and the local oscillator coils all as generaly indicated at 34 on the turret 31. The operation of those circuits characterized by appreciable stability, due to the improvement of comparative invulnerability of my three-point stress wiper contacts to shock and vibration.

What is claimed is:

1. In a tuner having a coil carrying turret and having stator elements, including electrical circuit means with contact portions and switched by means of the contact portions to connect the turret coils in a receiving circuit, a separable bipartite external housing, separative circuit contact portions therein, formed of stator wiper-contacts carried on one of the external housing parts and movable switching contacts carried on another housing part and together effecting a switching function of the contacts with one another, said one external housing part provided with stator bar means in the interior and carrying said stator wiper-contacts of that one part as aforesaid, said external housing parts having aligning and blocking lugs preventing each part from interference with the interior of another, and means between the external parts detachably fastening the separable housing together.

2. Electrical contact type, turret switched tuner having:
  a separable housing, with separative circuit contact portions therein formed of movable switching contacts and wiping stator-contacts;
  said separable housing formed of separable external sheet metal parts, one carrying the movable switching contacts and another carrying the wiping stator-contacts and together establishing cooperation of the contacts with one another;
  each of the external parts provided with blocking points thereon holding it from interference with the interior of the other of the parts, said one external part provided with a movably mounted turret in the interior movably carrying said movable switching contacts of that one part as aforesaid; and
  detachable fastening means between the external parts which, by act of being interfastened, render the separable housing detachably fastened together and which, by act of being separated, separate the separative circuit contact portions.

3. A turret tuner having a coil carrying rotor and having stator elements including at least VHF wiring adapted for connecting the rotor coils in a receiving circuit;
  a separable housing having a relatively major part and a minor part, the wiring in said tuner being carried by the minor housing part; and
  a stator bar flexibly supported on the minor housing part and carrying a row of wipers intermediate the ends of the stator bar;
  the rotor being journalled to the major housing part and establishing cooperation with the wipers whereby the wipers operatively interconnect the tuner wiring and selected coils on the rotor for tuning the receiving circuit;
  said major housing part having bar guide slots of a wedge shape which are formed to receive opposite ends of the stator bar on the minor one of the housing parts and which, when engaged by such bar ends when the housing parts are brought together, guide and locate the stator bar and its wipers so that they are referenced in their longitudinal position with respect to the rotor and parallel to, and at least a spaced distance away from, the rotor axis.

4. The invention of claim 2, characterized by the wipers comprising J-shaped spring strips each flexibly supported by its long leg which has a cantilever connection to the stator bar, and flexibly supported by the short leg thereof which has a connection riding against the stator bar; and contact means on the rotor engageable along the curve of each wiper in a manner causing a bending force in the portion between the contact means and the connection of the long leg and a bending force in the portion between the contact means and the riding connectio of the short leg, whereby the wiper is under three point stress.

5. The invention of claim 3, the curve of each wiper forming part of a loop looping over and into the short leg and having an extended contacting portion on one side of the loop, the extended contacting portion on said one side of the loop and the riding connection of the short leg on the opposite side of the loop being substantially in transverse alignment with one another.

6. The invention of claim 5, wherein:

the contact means and loop of each contacted wiper are in normal engagement with one another on a radial line substantially common to the rotor axis and the riding connection of the short leg.

7. The invention of claim 6, wherein:

said radial line is at least approximately normal to the loop.

8. The invention of claim 5, the loop of the wiper and the short leg coordinately rotating with a winding or unwinding motion about the cantilever long leg as the contact means wipes along said extended contacting portion of the wiper.

9. The invention of claim 6, each wiper carrying a coat of lubricant at least coextensively thereon with the extended contacting portion and said riding connection.

10. The invention of claim 3, a plurality of sheet metal hook tabs on at least one of the parts, and such hook tab on that part being interengaged with means on the other part for retaining the parts when brought together.

11. The invention of claim 10, one of the parts carrying a short attachment flange means which is face to face with other attachment means on the other part when the parts are brought together, so as to provide abutting rigidity at the joint.

12. The invention of claim 11, and fasteners between the two attachment means acting in tension to clamp the two parts together.

13. The invention of claim 12, said parts comprising sheet metal stampings, arranged with the edge walls in an overlapping relation at substantially all points whereby each part is blocked at points holding it from the interior of the other part.

References Cited
UNITED STATES PATENTS

| | | | |
|---|---|---|---|
| 2,525,408 | 10/1950 | Graybill et al. | 200—166.1 |
| 2,545,681 | 3/1951 | Zepp et al. | |
| 2,718,623 | 9/1955 | Yoder et al. | 334—49 X |
| 2,878,378 | 3/1959 | Carlson | 334—49 X |
| 2,975,276 | 3/1961 | Thias | 334—51 |
| 3,187,281 | 6/1965 | Weiner et al. | 334—85 X |
| 3,327,259 | 6/1967 | Hale | 334—50 |
| 3,159,724 | 12/1964 | Parstorfer | 310—240 X |
| 3,399,362 | 8/1968 | Ma et al. | 334—51 |

HERMAN KARL SAALBACH, Primary Examiner

W. H. PUNTER, Assistant Examiner

U.S. Cl. X.R.

334—85; 200—8, 166